United States Patent
Chen

(10) Patent No.: US 10,194,140 B2
(45) Date of Patent: Jan. 29, 2019

(54) BINOCULAR STEREO VISION DEVICE, ADJUSTING METHOD AND APPARATUS THEREOF AND DISPLAY DEVICE

(71) Applicant: BOE TECHNOLOGY GROUP CO., LTD., Beijing (CN)

(72) Inventor: Shuo Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 146 days.

(21) Appl. No.: 15/037,527

(22) PCT Filed: Nov. 23, 2015

(86) PCT No.: PCT/CN2015/095281
§ 371 (c)(1),
(2) Date: May 18, 2016

(87) PCT Pub. No.: WO2016/197551
PCT Pub. Date: Dec. 15, 2016

(65) Prior Publication Data
US 2017/0134715 A1   May 11, 2017

(30) Foreign Application Priority Data
Jun. 10, 2015  (CN) .......................... 2015 1 0316434

(51) Int. Cl.
*H04N 13/296* (2018.01)
*G03B 35/08* (2006.01)
(Continued)

(52) U.S. Cl.
CPC ............. *H04N 13/296* (2018.05); *G01C 3/04* (2013.01); *G01C 3/08* (2013.01); *G01C 3/14* (2013.01);
(Continued)

(58) Field of Classification Search
CPC ........... H04N 13/0296; H04N 13/0239; H04N 2213/001; G01C 3/04; G01C 3/08
See application file for complete search history.

(56) References Cited

U.S. PATENT DOCUMENTS 8,791,987 B2   7/2014   Ho
9,025,009 B2   5/2015   Lievens et al.
(Continued)

FOREIGN PATENT DOCUMENTS

CN   201114560 Y   9/2008
CN   101276138 B   11/2010
(Continued)

OTHER PUBLICATIONS

Li, Yaoyun et al. "Object Location Technique for Binocular Stereo Vision Based on Harris-SIFT Algorithm", Television Technology, Sep. 30, 2013 (Sep. 30, 2013) No. 9, vol. 37.*
(Continued)

*Primary Examiner* — Anner N Holder
*Assistant Examiner* — Hesham K Abouzahra
(74) *Attorney, Agent, or Firm* — Collard & Roe, P.C.

(57) ABSTRACT

A binocular stereo vision device, adjusting method and apparatus thereof and a display device are provided. The binocular stereo vision device includes: an acquisition system including two acquisition units (1) arranged at intervals and being configured to acquire a depth distance from a measured object to the acquisition system; an adjustment mechanism (3) configured to adjust a distance between the two acquisition units (1); a sensor (2) configured to acquire an initial distance between the two acquisition units (1); and a processing unit (4) configured to obtain a standard distance between the two acquisition units (1) according to the acquired depth distance from the measured object to the acquisition system and output a control signal according to
(Continued)

a difference between the standard distance and the initial distance, wherein the adjustment mechanism (3) adjusts the distance between the two acquisition units (1) to be equal to the standard distance according to the control signal outputted by the processing unit (4). The binocular stereo vision device, adjusting method and apparatus thereof and the display device can improve the recognition range and the recognition accuracy of the binocular stereo vision device.

18 Claims, 2 Drawing Sheets

(51) Int. Cl.
    *G01C 3/04*         (2006.01)
    *G01C 3/08*         (2006.01)
    *G01C 3/14*         (2006.01)
    *H04N 13/239*     (2018.01)

(52) U.S. Cl.
    CPC ............ *G03B 35/08* (2013.01); *H04N 13/239* (2018.05); *H04N 2213/001* (2013.01)

(56) References Cited

U.S. PATENT DOCUMENTS

| | | |
|---|---|---|
| 9,451,238 B2 | 9/2016 | Lee |
| 2011/0261167 A1 | 10/2011 | Shin |
| 2013/0147924 A1* | 6/2013 | Ho .................... H04N 13/0239 348/47 |
| 2014/0085423 A1* | 3/2014 | Lee .................... H04N 13/0239 348/46 |
| 2016/0050345 A1* | 2/2016 | Longbotham ........ G02B 27/017 348/47 |
| 2017/0295357 A1* | 10/2017 | Yang .................. H04N 13/0055 |

FOREIGN PATENT DOCUMENTS

| | | |
|---|---|---|
| CN | 102771128 A | 11/2012 |
| CN | 102955349 A | 3/2013 |
| CN | 103167231 A | 6/2013 |
| CN | 103477645 A | 12/2013 |
| CN | 103888750 A | 6/2014 |
| CN | 104883560 A | 9/2015 |

OTHER PUBLICATIONS

Second Chinese Office Action in Chinese Application No. 201510316434.7, dated Dec. 28, 2016 with English translation.
Li, Yaoyun et al. "Object Location Technique for Binocular Stereo Vision Based on Harris-SIFT Algorithm", Television Technology, Sep. 30, 2013 (Sep. 30, 2013) No. 9, vol. 37, pp. 23-24, section 1, with English translation of relevant parts.
International Search Report of PCT/CN2015/095281 in Chinese, dated Mar. 8, 2016 with English translation.
Notice of Transmittal of the International Search Report of PCT/CN2015/095281 in Chinese, dated Mar. 8, 2015.
Written Opinion of the International Searching Authority of PCT/CN2015/095281 in Chinese, dated Mar. 8, 2015 with English translation.
Chinese Office Action in Chinese Application No. 201510316434.7, dated Jun. 24, 2016 with English translation.

* cited by examiner

BINOCULAR STEREO VISION DEVICE, ADJUSTING METHOD AND APPARATUS THEREOF AND DISPLAY DEVICE

CROSS REFERENCE TO RELATED APPLICATIONS

This application is the National Stage of PCT/CN2015/095281 filed on Nov. 23, 2015, which claims priority under 35 U.S.C. § 119 of Chinese Application No. 201510316434.7 filed on Jun. 10, 2015, the disclosure of which is incorporated by reference.

TECHNICAL FIELD

Embodiments of the present invention relate to a binocular stereo vision device, adjusting method and apparatus thereof and a display device.

BACKGROUND

Binocular stereo vision technology can be applied to the measurement and recognition of the depth of an object and is similar to the principle of recognizing the depth by the human eyes. The binocular stereo vision device in the prior art mainly includes: two lenses arranged at intervals, being configured to acquire images which are used for recognizing a measured object, in which the recognition content mainly includes information such as outline, color and depth.

However, due to the field angle of the lenses, the resolution of a complementary metal oxide semiconductor (CMOS) and the hardware limitation of an image processing chip, the measured object within a specific range can be recognized and the recognition accuracy can be affected no matter the object is too close to the lenses or too far away from the lenses.

However, the recognition distance is mainly affected by the distance between the two lenses. As the distance between the two lenses in the binocular stereo vision device in the prior art is fixed, the recognition distance of the binocular stereo vision device in the prior art is also limited.

SUMMARY

Embodiments of the invention provide a binocular stereo vision device, adjusting method and apparatus thereof and a display device, so as to improve the recognition range and the recognition accuracy of the binocular stereo vision device.

In one aspect, an embodiment of the invention provides a binocular stereo vision device, comprising: an acquisition system including two acquisition units arranged at intervals and being configured to acquire a depth distance from a measured object to the acquisition system; an adjustment mechanism configured to adjust a distance between the two acquisition units; a sensor configured to acquire an initial distance between the two acquisition units; and a processing unit configured to obtain a standard distance between the two acquisition units according to the acquired depth distance from the measured object to the acquisition system and output a control signal according to a difference between the standard distance and the initial distance, wherein the adjustment mechanism adjusts the distance between the two acquisition units to be equal to the standard distance according to the control signal outputted by the processing unit.

In another aspect, an embodiment provides a method for adjusting a binocular stereo vision device, comprising: acquiring a depth distance from a measured object to an acquisition system; acquiring an initial distance between two acquisition units which has not been adjusted by an adjustment mechanism; obtaining a standard distance between the two acquisition units according to the acquired depth distance from the measured object to the acquisition unit, and outputting a control signal according to a difference between the standard distance and the initial distance; and controlling the adjustment mechanism to adjust the distance between the two acquisition units to be equal to the standard distance according to the control signal.

In another aspect, an embodiment of the invention provides an apparatus for adjusting the binocular stereo vision device, comprising: a first receiving module configured to receive a depth distance from a measured object to an acquisition system; a second receiving module configured to receive an initial distance between two acquisition units which has not been adjusted by an adjustment mechanism; a calculation module configured to obtain a standard distance between the two acquisition units according to the received depth distance from the measured object to the acquisition unit, and output an initial control signal according to a difference between the standard distance and the initial distance; and a control module configured to output a control signal according to the initial control signal outputted by the calculation module to control the adjustment mechanism to adjust the distance between the two acquisition units to be equal to the standard distance.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 1:
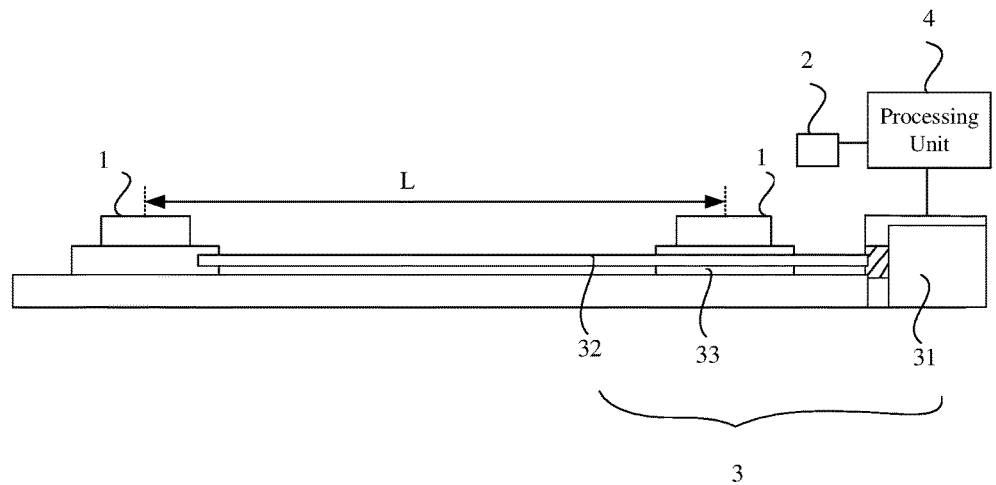
FIG. 1 is a first schematic structural view of a binocular stereo vision device provided by the embodiment of the present invention.

As illustrated in FIG. 1 which is a first schematic structural view of a binocular stereo vision device provided by the embodiment of the present invention, the binocular stereo vision device includes:

an acquisition system including two acquisition units 1 arranged at intervals and being configured to acquire the depth distance from a measured object to the acquisition system;

an adjustment mechanism 3 configured to adjust the distance between the two acquisition units 1;

a sensor 2 configured to acquire the initial distance L between the two acquisition units 1 which has not been adjusted by the adjustment mechanism 3; and a processing unit 4 configured to obtain the standard distance between the two acquisition units 1 according to the acquired depth distance from the measured object to the acquisition system, and output a control signal according to the difference between the standard distance and the initial distance, wherein the adjustment mechanism 3 adjusts the distance between the two acquisition units 1 to be equal to the standard distance according to the control signal outputted by the processing unit 4.

The binocular stereo vision device provided by the embodiment of the present invention can automatically adjust the distance between the two acquisition units 1, so that the binocular stereo vision device can be always in a preferred recognition range of viewing angles and is applicable to the recognition of measured objects with different depth distances. Therefore, the binocular stereo vision device provided by the embodiment of the present invention has wide recognition range and good recognition accuracy.

The depth distance refers to the distance from the measured object to a plane provided with the two acquisition units, and is the perpendicular distance from the measured object to the plane.

Figure 2:
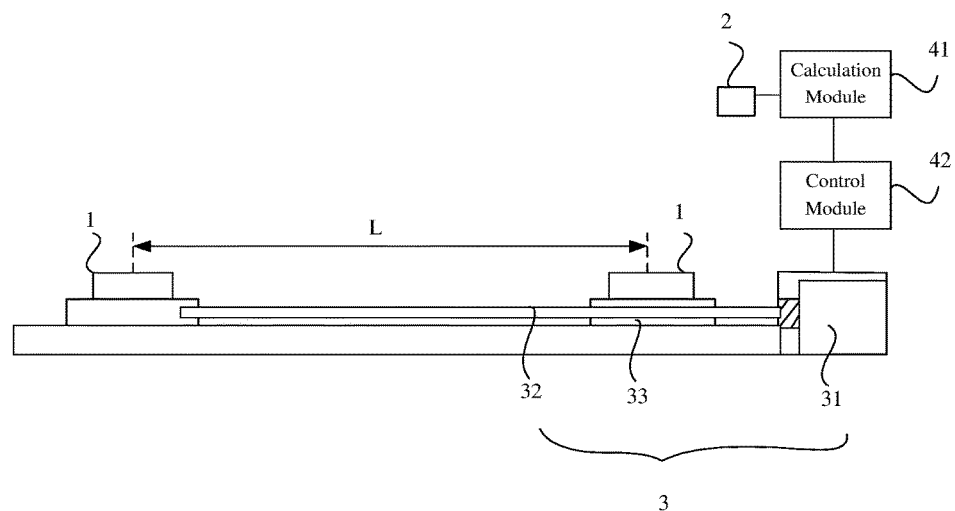
FIG. 2 is a second schematic structural view of the binocular stereo vision device provided by the embodiment of the present invention.

Moreover, as illustrated in FIG. 2 which is a second schematic structural view of the binocular stereo vision device provided by the present invention, the processing unit 4 includes:

a calculation module 41 configured to obtain the standard distance according to the formula $D_{best}=(L*F)/R_Z$ and also configured to obtain an initial control signal according to the difference between the standard distance and the initial distance, in which $D_{best}$ refers to the acquired depth distance from the measured object to the acquisition system; L refers to the standard distance between the two acquisition units; F refers to the focal length of the acquisition units; $R_Z$ refers to the depth resolution; and a control module 42 being in signal connection with the calculation module 41 and configured to output a control signal according to the received initial control signal to control the adjustment mechanism 3 to adjust the distance between the two acquisition units 1.

The depth resolution $R_Z$ may be obtained by multiple test measurements.

In the process of adjusting the distance between the two acquisition units, the two acquisition units may be moved simultaneously or only one acquisition unit is moved. For instance, in the two acquisition units 1, the first acquisition unit is fixed and the second acquisition unit may move relative to the first acquisition unit. Thus, the spacing between the two acquisition units 1 can be conveniently adjusted.

In an optional embodiment, as illustrated in FIG. 1, the adjustment mechanism 3 includes: a driving module 31 in signal connection with the processing unit 4 and a movement module connected with the driving module and configured to move the second acquisition unit.

Illustratively, the movement module may have a plurality of forms.

Optionally, the movement module may include: a threaded shaft 32; and a mounting base 33 slideably mounted on the threaded shaft 32 and provided with the second acquisition unit. The mounting base is driven to move by the rotation of the threaded shaft, so that the distance between the two acquisition units 1 can be adjusted. In the case of adjustment, the calculation module calculates a signal about the rotation angle of the driving module, according to the difference between the standard distance and the initial distance, to control the operation of the driving module.

Optionally, the movement module may include: a telescopic cylinder, in which a cylinder body of the telescopic cylinder is fixed relative to the driving module; and an extension end of a cylinder rod of the telescopic cylinder is fixedly connected with the second acquisition unit. The telescopic cylinder may be a pneumatic telescopic cylinder and may also be a hydraulic cylinder.

Illustratively, the binocular stereo vision device may further comprise: a sensing module being in signal connection with the processing unit 4 and configured to control the operation of the processing unit according to a sensed command signal. The command signal herein may be a gesture signal or the like of an operator. No further description will be given here.

The embodiment of the present invention further provides a display device, which comprises: any foregoing binocular stereo vision device.

As the binocular stereo vision device can improve the recognition range and the recognition accuracy of the binocular stereo vision device, the display device provided by the embodiment of the present invention has good display effect.

Illustratively, the embodiment of the present invention further provides a method for adjusting a binocular stereo vision device, which comprises:

S301: acquiring the depth distance from a measured object to an acquisition system;

S302: acquiring the initial distance between two acquisition units which has not been adjusted by an adjustment mechanism;

S303: obtaining the standard distance between the two acquisition units according to the acquired depth distance from the measured object to the acquisition unit, and outputting a control signal according to the difference between the standard distance and the initial distance; and S304: controlling the adjustment mechanism to adjust the distance between the two acquisition units to be equal to the standard distance according to the control signal.

Moreover, obtaining the standard distance between the two acquisition units according to the acquired depth distance from the measured object to the acquisition unit may include:

obtaining the standard distance according to the formula $D_{best}=(L*F)/R_Z$, in which $D_{best}$ refers to the acquired depth distance from the measured object to the acquisition system; L refers to the standard distance between the two acquisition units; F refers to the focal length of the acquisition units; and $R_Z$ refers to the depth resolution.

Figure 3:
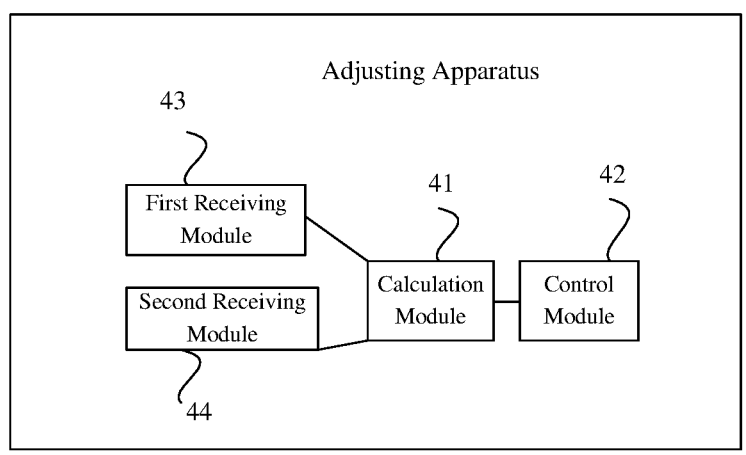
FIG. 3 is a schematic structural view of an apparatus for adjusting the binocular stereo vision device, provided by the embodiment of the present invention.

Based on the above adjusting method, an adjusting apparatus may be provided, as illustrated in FIG. 3 which is a schematic structural view of an apparatus for adjusting the binocular stereo vision device, provided by the embodiment of the present invention. The apparatus for adjusting the binocular stereo vision device, provided by the embodiment of the present invention, may comprise:

a first receiving module 43 configured to receive the depth distance from the measured object to the acquisition system;

a second receiving module 44 configured to receive the initial distance between the two acquisition units which has not been adjusted by the adjustment mechanism;

a calculation module 41 configured to obtain the standard distance between the two acquisition units according to the received depth distance from the measured object to the acquisition unit, and output an initial control signal according to the difference between the standard distance and the initial distance; and a control module 42 configured to output a control signal according to the initial control signal outputted by the calculation module to control the adjustment mechanism to adjust the distance between the two acquisition units to be equal to the standard distance.

Obviously, the binocular stereo vision device and the adjusting method and apparatus thereof, provided by the embodiment of the present invention, can improve the recognition range and the recognition accuracy of the binocular stereo vision device. In addition, the embodiment of the present invention further provides a display device, which has good display effect.

The binocular stereo vision device provided by the embodiment of the present invention can automatically adjust the distance between the two acquisition units according to the depth distance from the measured object to the acquisition system, so that the binocular stereo vision device can be always in a preferred recognition range of viewing angles and can recognize measured objects with different depth distances. Therefore, the binocular stereo vision device provided by the present invention has wide recognition range and good recognition accuracy.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to include the modifications and deformations.

The application claims priority to the Chinese patent application No. 201510316434.7, filed Jun. 10, 2015, the disclosure of which is incorporated herein by reference as part of the application.

The invention claimed is:

1. A binocular stereo vision device, comprising:
an acquisition system including two acquisition units arranged at intervals and being configured to acquire a depth distance from a measured object to the acquisition system;
an adjuster configured to adjust a distance between the two acquisition units;
a sensor configured to acquire an initial distance between the two acquisition units; and
a processing unit configured to obtain a standard distance between the two acquisition units according to the acquired depth distance from the measured object to the acquisition system and output a control signal according to a difference between the standard distance and the initial distance, wherein the adjuster adjusts the distance between the two acquisition units to be equal to the standard distance according to the control signal outputted by the processing unit, the processing unit includes: a calculator configured to obtain the standard distance according to a formula $D_{best}=(L*F)/R_Z$ and obtain an initial control signal according to the difference between the standard distance and the initial distance, in which $D_{best}$ refers to the acquired depth distance from the measured object to the acquisition system; L refers to the standard distance between the two acquisition units; F refers to a focal length of the acquisition units; $R_Z$ refers to a depth resolution.

2. The binocular stereo vision device according to claim 1, wherein the processing unit further includes:
a controller being in signal connection with the calculator and configured to output the control signal according to the received initial control signal to control the adjuster to adjust the distance between the two acquisition units.

3. The binocular stereo vision device according to claim 2, wherein in the two acquisition units, the first acquisition unit is fixed and the second acquisition unit is capable of moving relative to the first acquisition unit.

4. The binocular stereo vision device according to claim 3, wherein the adjuster includes: a driver in signal connection with the processing unit and a movement module connected with the driver and configured to move the second acquisition unit.

5. The binocular stereo vision device according to claim 4, wherein the movement module includes:
a threaded shaft; and
a mounting base slideably mounted on the threaded shaft and provided with the second acquisition unit.

6. The binocular stereo vision device according to claim 4, wherein the movement module includes: a telescopic cylinder; a cylinder body of the telescopic cylinder is fixed relative to the driver; and an extension end of a cylinder rod of the telescopic cylinder is fixedly connected with the second acquisition unit.

7. The binocular stereo vision device according to claim 1, further comprising: a sensing module being in signal connection with the processing unit and configured to control an operation of the processing unit according to a sensed command signal.

8. The binocular stereo vision device according to claim 2, wherein the processing unit further includes:
a first receiver configured to receive the depth distance from the measured object to the acquisition system; and
a second receiver configured to receive the initial distance between the two acquisition units which has not been adjusted by the adjuster.

9. A display device, comprising: the binocular stereo vision device according to claim 1.

10. A method for adjusting a binocular stereo vision device, comprising:
acquiring a depth distance from a measured object to an acquisition system;
acquiring an initial distance between two acquisition units which has not been adjusted by an adjuster;
obtaining a standard distance between the two acquisition units according to the acquired depth distance from the measured object to the acquisition unit, and outputting a control signal according to a difference between the standard distance and the initial distance; and
controlling the adjuster to adjust the distance between the two acquisition units to be equal to the standard distance according to the control signal, wherein obtaining the standard distance between the two acquisition units according to the acquired depth distance from the measured object to the acquisition unit includes:

obtaining the standard distance according to a formula $D_{best}=(L*F)/R_Z$, in which $D_{best}$ refers to the acquired depth distance from the measured object to the acquisition system; L refers to the standard distance between the two acquisition units; F refers to a focal length of the acquisition unit; and $R_Z$ refers to a depth resolution.

11. An apparatus for adjusting the binocular stereo vision device, comprising:

a first receiver configured to receive a depth distance from a measured object to an acquisition system;

a second receiver configured to receive an initial distance between two acquisition units which has not been adjusted by an adjuster;

a calculator configured to obtain the standard distance according to a formula $D_{best}=(L*F)/R_Z$ and obtain an initial control signal according to the difference between the standard distance and the initial distance, in which $D_{best}$ refers to the acquired depth distance from the measured object to the acquisition system; L refers to the standard distance between the two acquisition units; F refers to a focal length of the acquisition units; $R_Z$ refers to a depth resolution; and a controller configured to output a control signal according to the initial control signal outputted by the calculator to control the adjuster to adjust the distance between the two acquisition units to be equal to the standard distance.

12. The display device according to claim 9, wherein the processing unit further includes:

a controller being in signal connection with the calculator and configured to output the control signal according to the received initial control signal to control the adjuster to adjust the distance between the two acquisition units.

13. The display device according to claim 12, wherein in the two acquisition units, the first acquisition unit is fixed and the second acquisition unit is capable of moving relative to the first acquisition unit.

14. The display device according to claim 13, wherein the adjuster includes: a driver in signal connection with the processing unit and a movement module connected with the driver and configured to move the second acquisition unit.

15. The display device according to claim 14, wherein the movement module includes:

a threaded shaft; and a mounting base slideably mounted on the threaded shaft and provided with the second acquisition unit.

16. The display device according to claim 14, wherein the movement module includes: a telescopic cylinder; a cylinder body of the telescopic cylinder is fixed relative to the driver; and an extension end of a cylinder rod of the telescopic cylinder is fixedly connected with the second acquisition unit.

17. The display device according to claim 1, further comprising: a sensing module being in signal connection with the processing unit and configured to control an operation of the processing unit according to a sensed command signal.

18. The display device according to claim 12, wherein the processing unit further includes:

a first receiver configured to receive the depth distance from the measured object to the acquisition system; and a second receiver configured to receive the initial distance between the two acquisition units which has not been adjusted by the adjuster.

* * * * *